US006539100B1

(12) United States Patent
Amir et al.

(10) Patent No.: US 6,539,100 B1
(45) Date of Patent: Mar. 25, 2003

(54) METHOD AND APPARATUS FOR ASSOCIATING PUPILS WITH SUBJECTS

(75) Inventors: Arnon Amir, Cupertino, CA (US); Myron Dale Flickner, San Jose, CA (US); David Bruce Koons, San Jose, CA (US); Carlos Hitoshi Morimoto, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/238,979

(22) Filed: Jan. 27, 1999

(51) Int. Cl.[7] .................................................. G06K 9/00

(52) U.S. Cl. ...................................... 382/117; 382/173

(58) Field of Search ................................. 382/117, 199, 382/128, 173, 286; 351/206, 221, 208, 210; 434/40, 42

(56) References Cited

U.S. PATENT DOCUMENTS

| | | | | |
|---|---|---|---|---|
| 4,275,385 | A | | 6/1981 | White .......................... 340/312 |
| 4,625,329 | A | | 11/1986 | Ishikawa et al. ................ 382/1 |
| 4,931,865 | A | | 6/1990 | Scarampi ..................... 358/84 |
| 5,016,282 | A | * | 5/1991 | Tomono et al. ............. 382/117 |
| 5,291,560 | A | * | 3/1994 | Daugman .................... 382/117 |
| 5,430,809 | A | | 7/1995 | Tomitaka .................... 382/173 |
| 5,432,866 | A | * | 7/1995 | Sakamoto ................... 382/128 |
| 5,550,928 | A | | 8/1996 | Lu et al. ...................... 382/116 |
| 5,596,362 | A | | 1/1997 | Zhou ............................ 348/14 |

OTHER PUBLICATIONS

Aizawa et al., "Detection and Tracking of Facial Features," Proc. of the SPIE Com. and Image Proc. (1995), v. 2501, Taipei Taiwan, pp. 1161–1172.

Baluja et al., "Neutral Network–Based Face Detection," Proc. IEEE Conf. on Computer Vision and Pattern Recognition (1996), San Francisco, CA, pp. 203–208.

Baluja et al., "Rotation Invariant Neutral Network–Based Face Detection," Proc. IEEE Conf. on Computer Vision and Pattern Recognition (Jun. 1998), Santa Barbara, CA, pp. 38–44.

Bérard et al., "LAFTER: Lips and Face Real Time Tracker," Proc. IEEE Conf. on Computer Vision and Pattern Recognition (Jun. 1997), Puerto Rico, pp. 123–129.

(List continued on next page.)

*Primary Examiner*—Andrew W. Johns
*Assistant Examiner*—Seyed Azarian
(74) *Attorney, Agent, or Firm*—Dan Hubert (57) ABSTRACT

A method and apparatus analyzes a scene to determine which pupils correspond to which subjects. First, a machine-readable representation of the scene, such as a camera image, is generated. Although more detail may be provided, this representation minimally depicts certain visually perceivable characteristics of multiple pupil candidates corresponding to multiple subjects in the scene. A machine such as a computer then examines various features of the pupil candidates. The features under analysis include (1) visually perceivable characteristics of the pupil candidates at one given time ("spatial cues"), and (2) changes in visually perceivable characteristics of the pupil candidates over a sampling period ("temporal cues"). The spatial and temporal cues may be used to identify associated pupil pairs. Some exemplary spatial cues include interocular distance, shape, height, and color of potentially paired pupils. In addition to features of the pupils themselves, spatial cues may also include nearby facial features such as presence of a nose/mouth/eyebrows in predetermined relationship to potentially paired pupils, a similarly colored iris surrounding each of two pupils, skin of similar color nearby, etc. Some exemplary temporal cues include motion or blinking of paired pupils together, etc. With the foregoing examination, each pupil candidate can be associated with a subject in the scene.

65 Claims, 2 Drawing Sheets

OTHER PUBLICATIONS

Birchfeld, "Elliptical Head Tracking Using Intensity Gradients and Color Histograms," Proc. IEEE Conf. on Computer Vision and Pattern Recognition (1998), pp. 232–237.

Cohen et al., "Feature Extraction From Faces Using Deformable Template," International Journal of Computer Vision (1992), vol. 8, No. 2, pp. 99–111.

Darrell et al., "Active Face Tracking and Pose Estimation in an Interactive Room," MIT Media Lab, TR–356 (1996), pp. 1–16.

Darrell et al., "A Virtual Mirror Interface Using Real–Time Robust Face Tracking," Proc. Int'l conf. on Automatic Face and Gesture Recognition (Apr. 1998), Japan, pp. 616–621.

Darrell et al., "Integrated Person Tracking Using Stereo, Color, and Pattern Detection," Proc. IEEE on Conf. on Computer Vision and Pattern Recognition (Jun. 1998), Santa Barbara, CA, pp. 601–608.

Ebisawa et al., "Effectiveness of Pupil Area Detection Technique Using Two Light Sources and Image Difference Method", *Proc. of the 15$^{th}$ Ann. Int'l Conf. of IEEE Engineering in Medicine and Biology Society*, vol. 15, (Jan. 1993), pp. 1268–1269.

Ebisawa, "Unconstained Pupil Detection Technique Using Two Light Sources and the Image Difference Method", Visualization and Intelligent Design in Engineering and Architecture (1995), pp. 79–89.

Fieguth et al., "Color–Based Tracking of Heads and Other Mobile Objects at Video Frame Rates", Proc. IEEE Conference on Computer Vision and Pattern Recognition (1997), pp. 21–27.

Govindaraju et al., "A Computational Model For Face Location," Proc. of the Int'l Conf. on computer Vision (Dec. 1990), pp. 718–721, Osaka, Japan.

Harville et al., "Tracking People With Integrated Stereo, Color, and Face Detection,", Proc. of the IEEE Conference on Computer Vision and Pattern Recognition, Jun. 1998, pp. 601–608.

Kothari et al., "Detection of Eye Locations in Unconstrained Visual Images", Proc. Int'l Conf. on Image Processing (1996), Switzerland, pp. 519–522.

Poggio et al., "Example–Based Learning for View–Based Human Face Detection," MIT AI Lab TR–AI–1521 (1994), pp. 1–20.

Scassellati, "Eye Finding via Face Detection for a Foveated, Active Vision System," Proceedings of the 15$^{th}$ Conf. on Artificial Intelligence (AAAI–98), ISBM 0–262–51098–7, Jul. 26–30, 1998.

Scassellati, "Real–Time Face and Eye Detection," world–wide–web, 1998.

Stiefelhagen et al., "A Model–Based Gaze Tracking System," Proc. Joint Symposium on Intelligence and Systems (1996), pp. 304–310.

Sirohey, "Human Face Segmentation and Identification", CAR–TR–695, CS–TR–3176, (1993 ), pp. 1–33.

Waibel et al., "A Real–Time Face Tracker", Proc. of the 3$^{rd}$ IEEE Workshop on Applications of Computer Vision (1996), Sarasota, FL, pp. 142–147.

* cited by examiner

METHOD AND APPARATUS FOR ASSOCIATING PUPILS WITH SUBJECTS

BACKGROUND OF THE INVENTION

1. Field of the Invention

The present invention relates to sophisticated interfaces between humans and machines. More particularly, the invention concerns a method and apparatus for analyzing a scene containing multiple subjects to determine which pupils correspond to which subjects.

2. Description of the Related Art

As more powerful human-machine interfaces are being developed, many such interfaces include the capability to perform user detection. By detecting the presence of a human user, a machine can manage its own functions more efficiently, and more reliably respond to human input. For example, a computer may employ user detection to selectively activate a screen saver when no users are present, or to display advertising banners only when a user is present. As another application, in home-based television viewing monitors for assessing "Nielson" ratings, it may be useful to determine how many people are watching a television. User detection techniques such as face detection may also be used as a valuable precursor to eye gaze detection. In addition, face detection will likely be an important component of future human-machine interfaces that consider head and facial gestures to supplement mouse, voice, keyboard, and other user input. Such head and facial gestures may include nodding, leaning forward, head shaking, and the like. Thus, user detection is an important tool that enables a more natural human-machine interface.

Some user detection techniques are already known. For instance, a number of techniques focus on face detection using a combination of attributes such as color, shape, motion, and depth. Some of these approaches, for example, include template matching as described in U.S. Pat. No. 5,550,928 to Lu et al., and skin color analysis as described in U.S. Pat. No. 5,430,809 to Tomitaka. Another approach is the "Interval" system. The Interval system obtains range information using a sophisticated stereo camera system, gathers color information to evaluate as flesh tones, and analyzes face candidate inputs with a neural network trained to find faces. One drawback of the Interval system is the substantial computation expense. An example of the Interval system is described in Darrell et al., "Tracking People With Integrated Stereo, Color, and Face Detection," Perceptual User Interface Workshop, 1997. Although the Interval system may be satisfactory for some applications, certain users with less powerful or highly utilized computers may be frustrated with the interval system's computation requirements. The following references discuss some other user detection schemes: (1) T. Darrell et al., "Integrated person Tracking Using Stereo, Color, and Pattern Detection," 1998, and (2) T. Darrell et al, "Active Face Tracking and Pose Estimation in an Interactive Room," 1996.

As a different approach, some techniques perform user detection based on pupil detection. Pupil characteristics may be further analyzed to track eye position and movement, as described in U.S. Pat. No. 5,016,282 to Ptomain et al. Although the '282 patent and other pupil detection schemes may be satisfactory for some applications, such approaches are unable to process multiple faces and multiple pupils in an input image. Some difficulties include determining which pupils belong to the same face, and accounting for a partially off-screen person with only one pupil showing.

Thus, when multiple people and multiple pupils are present in an image, there may be considerable difficulty in associating pupils with people in order to detect how many people are present. In this respect, known approaches are not completely adequate for some applications due to certain unsolved problems.

SUMMARY OF THE INVENTION

Broadly, the present invention concerns a method and apparatus for analyzing a scene containing multiple subjects to determine which pupils correspond to which subjects. First, a machine-readable representation of the scene, such as a camera image, is generated. Although more detail may be provided, this representation minimally depicts certain visually perceptible characteristics (such as relative locations, shape, size, etc.) of multiple pupil candidates corresponding to multiple subjects in the scene. A computer analyzes various characteristics of the pupil candidates, such as: (1) visually perceivable characteristics of the pupil candidates at one given time ("spatial cues"), and (2) changes in visually perceivable characteristics of the pupil candidates over a sampling period ("temporal cues"). The spatial and temporal cues may be used to identify associated pupil pairs, i.e., two pupils belonging to the same subject/ face. Some exemplary spatial cues include interocular distance between potentially paired pupils, horizontal alignment of pupils, same shape/size of pupils, etc. In addition to features of the pupils themselves, spatial cues may also include nearby facial features such as presence of a nose/ mouth/eyebrows in predetermined relationship to potentially paired pupils, similarly colored irises surrounding the pupils, nearby skin of similar color, etc. Some exemplary temporal cues include motion or blinking of paired pupils together. With the foregoing analysis, each pupil candidate can be associated with a subject in the scene.

In one embodiment, the invention may be implemented to provide a method for analyzing a scene containing multiple subjects to determine which pupils correspond to which subjects. In another embodiment, the invention may be implemented to provide a computer-driven apparatus programmed to analyze a scene containing multiple subjects to determine which pupils correspond to which subjects. In still another embodiment, the invention may be implemented to provide a signal-bearing medium tangibly embodying a program of machine-readable instructions executable by a digital data processing apparatus to perform operations for analyzing a scene containing multiple subjects to determine which pupils correspond to which subjects. Still another embodiment involves a logic circuit configured to analyze a scene containing multiple subjects to determine which pupils correspond to which subjects.

The invention affords its users with a number of distinct advantages. First, unlike prior techniques, the invention is capable of determining which pupils belong to which faces/ subjects in a scene with multiple subjects. In a scene with multiple subjects, understanding the pupil-subject relationship is an important prerequisite for tracking facial expressions, tracking movement, tracking user presence/ absence, etc. As another advantage, the invention is inexpensive to implement when compared to other detection and tracking systems. For example, no dense range sensing is required. Also, an inexpensive camera may be used when a suitable lighting scheme is employed to cancel noise. The analysis provided by the invention is particularly robust because it is based on the grouping of multiple cues, both spatial and temporal. The invention also provides a number of other advantages and benefits, which should be apparent from the following description of the invention.

DETAILED DESCRIPTION

The nature, objectives, and advantages of the invention will become more apparent to those skilled in the art after considering the following detailed description in connection with the accompanying drawings. As mentioned above, the invention concerns a system and method for analyzing a scene to determine which pupils correspond to which subjects.

Hardware Components & Interconnections
Introduction

One aspect of the invention concerns a system for associating detected pupils with subjects, which may be embodied by various hardware components and interconnections. One example is the system 100, shown in FIG. 1. Generally, the function of the system 100 is to analyze features of a scene 112, including "spatial" and/or "temporal" cues exhibited by the scene 112, to determine which pupils in the scene correspond to which subjects. As discussed below, one technique to map pupils to subjects is to find matching pairs of pupils. In the illustrated example, the scene 112 includes multiple subjects 114–116, which also may be referred to as "users," "people," etc. Human subjects are discussed throughout this disclosure for ease of explanation; however, the invention may also be practical with nonhuman subjects such as livestock, zoo animals, etc.

Figure 1:
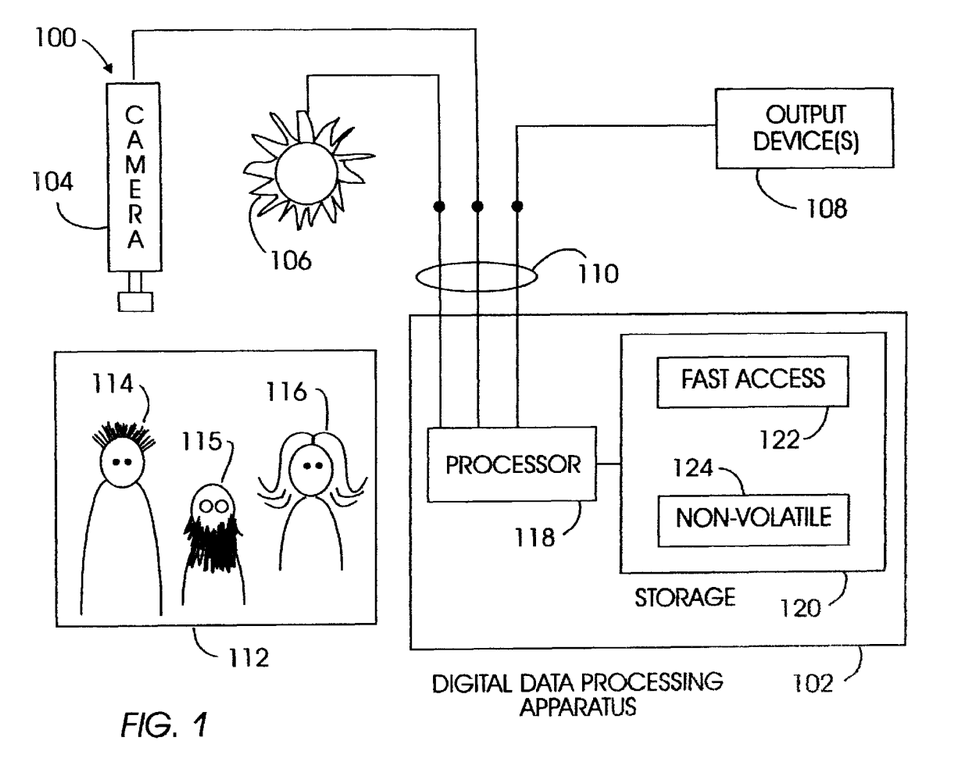
FIG. 1 is a block diagram of the hardware components and interconnections of a machine-driven system for analyzing a scene to determine which pupils correspond to which subjects.

Although facial analysis or representation of faces in the scene 112 is unnecessary, the system 100 may prepare a mapping specifically associating each pupil to a particular face in the scene 112. As explained below, the foregoing pupil-subject mapping analysis helps to provide more natural, user-friendly human-machine interfaces. For example, if the system 100 is used to operate a computer game, it can automatically determine how many players are present.

The system 100 includes a number of different components, which provide one example of the invention. Ordinarily skilled artisans (having the benefit of this disclosure) will recognize that certain components may be substituted, eliminated, consolidated, or changed in various ways without departing from the scope of the invention. The system 100 includes a digital data processing apparatus 102 ("computer"), a camera 104, a light source 106, and one or more output devices 108.

Light Source

The light source 106 may be used for various purposes, depending upon the manner of implementing the system 100. In one example, the light source 106 may serve to illuminate the subjects' pupils to aid in pupil detection. In this example, the light source 106 may include multiple light-emitting elements, such as two concentric rings of light-emitting elements as described in the '282 patent mentioned above. This embodiment works by creating a first image (using light from one angle) and a second pupil image (using light from a different angle). Pupils appear dark in one image and bright in the other, enabling their detection by computing the difference between the first and second images.

The light source 106 may also serve to illuminate the subject's faces, to aid in facial analysis if this optional feature is incorporated into the system 100. This function may be performed with the same light-emitting components used to illuminate pupils, or with additional light-emitting elements.

The light source 106 may be provided by an incandescent light bulb, fluorescent light bulb, infrared light-emitting device, candle, vessel of reacting chemicals, light-emitting diode(s), or another suitable source. Preferably, the light source 106 uses infrared light, so that the subjects are not disturbed by the light. To conveniently cast light upon the subjects 114–116, the light source casts light upon a wide area (e.g., omnidirectionally) rather than using a collimated beam such as a laser beam. In one embodiment, the light source 106 may be omitted, using ambient light instead such as room lighting, sunlight, etc.

Camera

The camera 104 comprises a device capable of representing the appearance of the scene 112 in machine-readable format. To suit this purpose, the camera 104 may comprise a black/white video camera, color video camera, camcorder, "still shot" digital camera, etc. The camera 104 may be sensitive to some or all of the visible spectrum of light, infrared light, another wavelength of light, or any other wavelength of emitted energy including at least the energy emitted by the light source 106. In an exemplary embodiment, where the light source 106 is an incandescent bulb, the camera 104 comprises a black/white video camera.

In one embodiment, a second camera (not shown) may also be used, where the cameras have different fields of view. The wide-angle camera may be used to generally locate the subject, with the narrow-angle camera being used to monitor more detailed features of the subject. The cameras may also be used cooperatively to determine the range to the subjects 114–116 using known stereo computer vision techniques. Furthermore, various other known non-vision-based range sensing systems may be used to provide range information.

Output Device(s)

The output devices(s) 108 include one or more devices that receive the results of the present invention's association of eyes (pupils) and subjects. For ease of illustration, only one output device is described, although there may be multiple output devices. In one embodiment, the output device 108 may comprise a mechanism reporting the association between detected pupils and subjects to a human user; such a mechanism may be a video monitor, sound speaker, LCD display, light-emitting diode, etc.

Another embodiment of the output device 108 is a machine whose operation uses pupil-subject mapping as an input. Some examples include (1) a "Nielson" rating monitor installed in a home to detect the number of television viewers, (2) a computer that activates or deactivates certain functions depending upon whether any subjects (and how many) are looking at the computer, (3) surveillance or crowd flow monitoring/management at movies, seminars, conferences, races, etc., and (4) surveillance or monitoring of a group of animals in a zoo, farm, ranch, laboratory, natural habitat, etc.

As another embodiment, the output device 108 may comprise a photographic camera for taking pictures of a group of people. The photographer provides input representing the number of pupils or people in the scene to the photographic camera (not shown), such as by adjusting an indicator wheel, setting a switch, rotating a dial, pressing buttons to enter data in conjunction with a menu shown on a display screen, etc. In addition to this input, the photographic camera receives certain electronic input from the computer 102. This input includes signals representing the number of pupils detected by the system 100 using the methods described herein. The photographic camera evaluates the computer input against the photographer's manual input, and avoids taking the group picture until the number of detected pupils (from the computer 102) equals the number of known pupils (entered by the photographer). In this way, the photographic camera ensures that the picture is taken when all subjects' eyes are open.

Digital Data Processing Apparatus

The computer 102 receives input from the camera 104 and performs computations to associate each eye (pupil) in the scene 112 with a subject. The computer 102 may also conduct preliminary analysis of the scene 112 to initially detect the pupils. As this feature is not necessary to the invention, however, the computer 102 may obtain such information from another source.

The computer 102 may be embodied by various hardware components and interconnections. As shown, the computer 102 includes a processor 118, such as a microprocessor or other processing machine, coupled to a storage 120. In the present example, the storage 120 includes a fast-access storage 122, as well as nonvolatile storage 124. The fast-access storage 122 may comprise random access memory (RAM), and may be used to store the programming instructions executed by the processor 118. The nonvolatile storage 124 may comprise, for example, one or more magnetic data storage disks such as a "hard drive," a tape drive, or any other suitable storage device. The computer 102 also includes an input/output 110, such as a number of lines, buses, cables, electromagnetic links, or other means for the processor 118 to exchange data with the hardware external to the computer 102, such as the light source 106, camera 104, and output device 108.

Despite the specific foregoing description, ordinarily skilled artisans (having the benefit of this disclosure) will recognize that the apparatus discussed above may be implemented in a machine of different construction, without departing from the scope of the invention. As a specific example, one of the components 122 and 124 may be eliminated; furthermore, the storage 120 may be provided on board the processor 118, or even provided externally to the computer 102.

Operation

In addition to the various hardware embodiments described above, a different aspect of the invention concerns a method for analyzing a scene and determining which pupils correspond to which subjects.

Signal-Bearing Media

In the context of FIG. 1, such a method may be implemented, for example, by operating the computer 102 to execute a sequence of machine-readable instructions. These instructions may reside in various types of signal-bearing media. In this respect, one aspect of the present invention concerns a programmed product, comprising signal-bearing media tangibly embodying a program of machine-readable instructions executable by a digital data processor to perform a method to associate eyes (pupils) in a scene with subjects.

Figure 2:
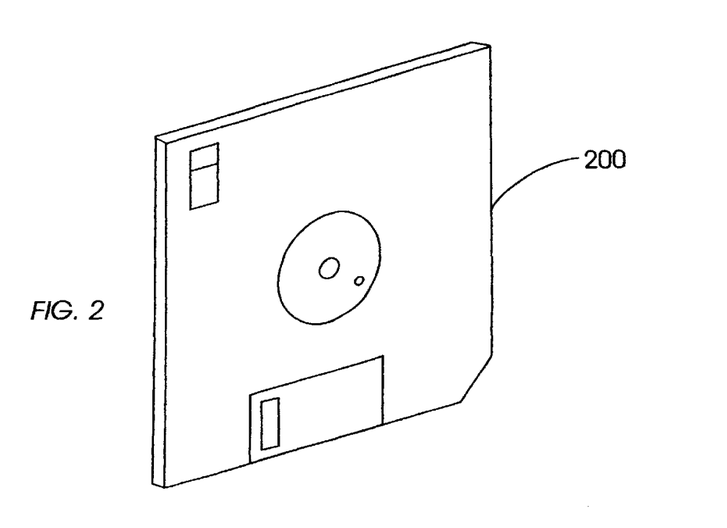
FIG. 2 shows an exemplary signal-bearing medium in accordance with the invention.

This signal-bearing media may comprise, for example, RAM (not shown) contained within the storage 120, as represented by the fast-access storage 122 for example. Alternatively, the instructions may be contained in another signal-bearing media, such as a magnetic data storage diskette 200 (FIG. 2), directly or indirectly accessible by the processor 118. Whether contained in the storage 120, diskette 200, or elsewhere, the instructions may be stored on a variety of machine-readable data storage media, such as a direct access storage device (DASD) (e.g., a conventional "hard drive," redundant array of inexpensive disks (RAID), or etc.), magnetic tape, electronic read-only memory (e.g., ROM, EPROM, or EEPROM), optical storage (e.g., CD-ROM, WORM, DVD, digital optical tape), paper "punch" cards, or other suitable signal-bearing media including transmission media such as digital and analog and communication links and wireless. In an illustrative embodiment of the invention, the machine-readable instructions may comprise software object code, compiled from a language such as "C," etc.

Logic Circuitry

In addition to the signal-bearing media discussed above, the association of pupils with subjects according to this invention may be implemented in a different way, without using a processor to execute instructions. Namely, this technique may be performed by using logic circuitry instead of executing stored programming instructions with a digital data processor. Depending upon the particular requirements of the application with regard to speed, expense, tooling costs, and the like, this logic may be implemented by constructing an application-specific integrated circuit (ASIC) having thousands of tiny integrated transistors. Such an ASIC may be implemented using CMOS, TTL, VLSI, or another suitable construction. Other alternatives include a digital signal processing chip (DSP), discrete circuitry (such as resistors, capacitors, diodes, inductors, and transistors), field programmable gate array (FPGA), programmable logic array (PLA), and the like.

In this embodiment, such logic circuitry may be used in replacement of the computer 102. Furthermore, the small size of the logic circuitry may permit installing, embedding, or otherwise integrating the logic circuitry into the camera 104 to provide an extremely compact overall package.

Overall Sequence of Operation

Figure 3:
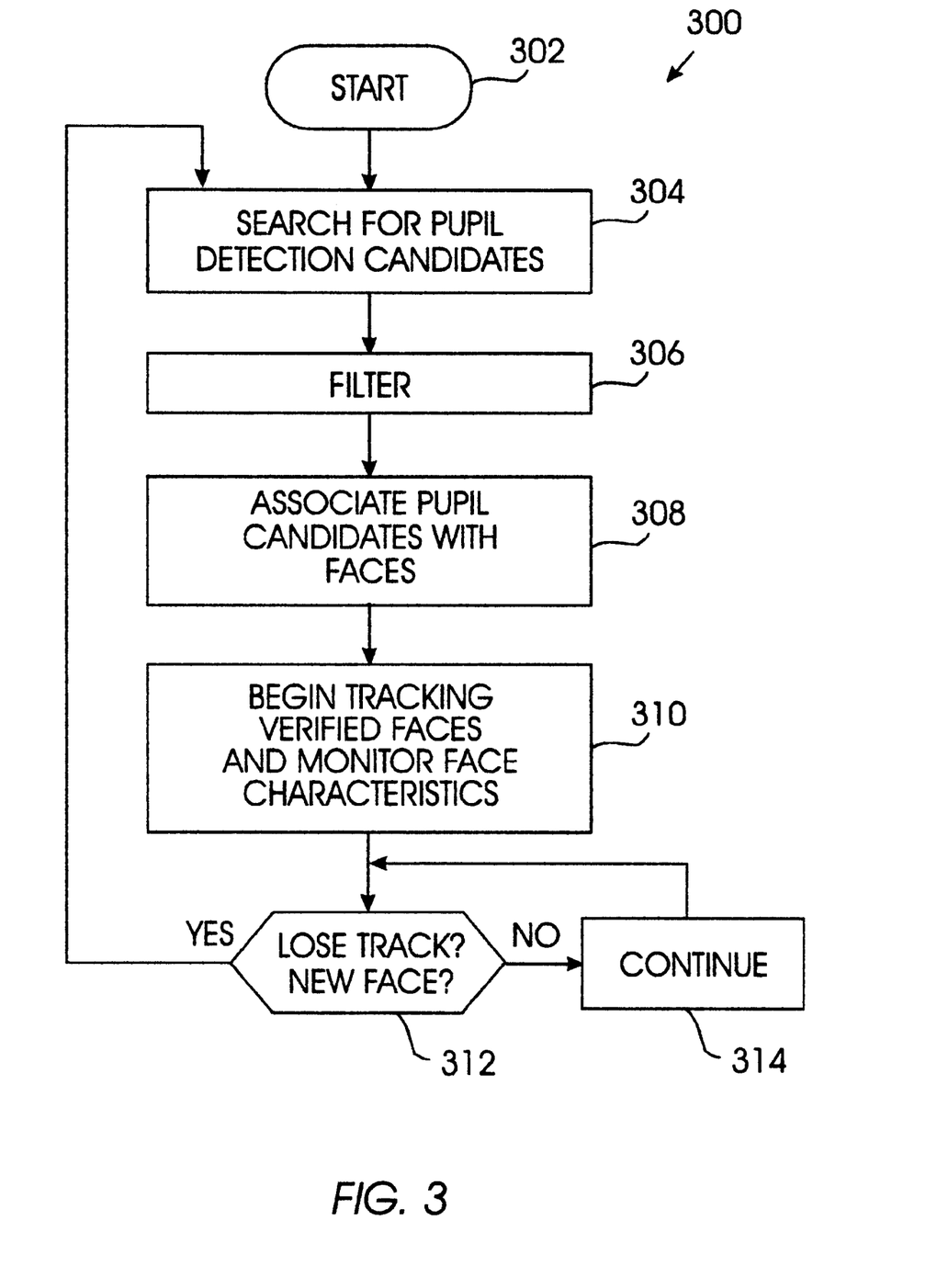
FIG. 3 is a flowchart depicting a sequence of operations for analyzing a scene to determine which pupils correspond to which subjects.

FIG. 3 shows a sequence 300 to illustrate one example of the present invention's method for analyzing a scene to determine which pupils correspond to which subjects. For ease of explanation, but without any intended limitation, the example of FIG. 3 is described in the context of the system 100 described above.

Locating Pupil Candidates

After the sequence 300 is initiated in step 302, step 304 searches for pupil candidates. In the illustrated embodiment, this operation begins by the camera 104 generating one or more machine-readable images of the scene 112. This may involve taking a snapshot, capturing several different pictures over time, or filming a video image. Next, the computer 102 analyzes the image(s) to search for pupil candidates, i.e., features likely to represent pupils. The search involves identifying any features of the image(s) that bear certain predefined characteristics.

In one example, the search for pupil candidates may be started by illuminating the scene 112 with different subcomponents of the light source having different relative angles to the subjects. This creates one image with dark pupils and another image with bright pupils. With this technique, pupil candidates are identified by computing the difference between the two images. This technique is described in detail in the '286 patent, mentioned above.

Although the '282 patent describes one embodiment of step 304, various other approaches will be also apparent to ordinarily skilled artisans having the benefit of this disclosure. The output of step 304 may comprise various types of machine-readable representation of the candidate pupils, such as (x,y) coordinates of pupil centers, an identification of pixels in each camera image corresponding to pupil candidates, or another representation of the size, shape, position, and/or other distinguishing features of the pupil candidates.

Filtering Single Pupil Candidates

Having identified a number of pupil candidates (possible pupils) in step 304, the computer 102 proceeds to filter individual candidates to eliminate false candidates (step 306). This operation may consider a number of different features to eliminate candidates that are not actually pupils. For instance, the following features of each pupil candidate may be evaluated:

- the pupil candidate's ratio of horizontal size to vertical size ("aspect ratio"), where an aspect ratio of 1:1 (vertical:horizontal) is sought to filter out motion disparities that might be mistaken for pupils.
- the pupil candidate's size, where a sufficiently small size is sought to filter out reflective emblems on clothing, such as so-called "retro" reflectors on running shoes and jackets, which may otherwise be mistaken as pupils.
- the pupil candidate's range, where subjects are expected to be positioned a certain distance away; this information may be derived from the camera's focal length, using two cameras to perceive depth, or using other distance sensing techniques or hardware.
- comparing the pupil candidate to certain model specifications, such as certain expected size, shape, color, and shape of the region surrounding the pupil; an example of this technique is discussed in Kothari & Mitchell, "Detection of Eye Location in Unconstrained Visual Images," Proc. Intl. Conf. on Image Processing, September 1996.
- eye blinking, exhibited by disappearance of the pupil candidate for about 250–600 milliseconds every 10–45 seconds, for example.

Having eliminated a number of false candidates in step 306, the remaining (filtered) candidates are especially likely to represent actual pupils. There still may be some false candidates, however, due to the candidates extreme similarities to pupils or due to limitations of the filtering process. Accordingly, the filtered results are still called "candidates."

Associate Pupils with Subjects

Having identified and filtered pupil candidates, step 308 performs the operation of associating the filtered pupil candidates with subjects. In the exemplary setup of FIG. 1 this operation is performed by the computer 102. Although step 308 may also perform the optional tasks of identifying regions in the image corresponding to faces and determining which pupils belong to the resultant facial regions, this is not necessary. In a more general sense, step 308 performs pupil-subject mapping by determining which filtered pupil candidates belong to which subject, regardless of whether the facial regions in the image are identified or analyzed. In this sense, step 308 is considered to perform "pupil-subject" mapping; but since eyes are a necessary part of the face, step 308 may also be considered to perform "pupil-face" mapping. As an example, in an image containing five pupil candidates, step 308 may conclude that pupil numbers one and two belong to one subject, pupils three and four belong to a different subject, and pupil five belongs to another different subject. This provides a useful foundation for tracking subjects' movement, facial expressions, presence in the scene 112, etc.

To map pupils to subjects, step 308 considers "spatial" cues as well as "temporal" cues. The spatial cues are visually perceivable characteristics of the pupils or surrounding areas in one image ("static"), whereas the temporal cues concern changes in visual characteristics over time ("dynamic"). Some exemplary spatial cues include characteristics of the pupils themselves, and may be employed to associate pupils with people by matching counterpart pupils of a pair. Some exemplary pupil characteristics include one or more of the following:

1) two pupil candidates may be counterparts if they have the same size and/or shape.
2) two pupil candidates may be counterparts if they have the same approximate height (vertical level) in the image.
3) two pupils may be counterparts if they have an interocular distance of between 2.5"–4.5".
4) two pupil candidates may be counterparts if they exhibit the same range to the camera 104.
5) two pupil candidates may be ruled out at counterparts if an imaginary line connecting them is crossed by one or more imaginary lines connecting other candidates; in one example, crossing lines may be resolved by rechecking other cues (spatial and temporal) regarding the conflicting pairs; the pupil pair with the higher probabilistic rating may be considered to represent matched pupils, whereas the other two pupils are no longer considered to be a pair.

In addition to aspects of the pupils themselves, other spatial cues include visually perceivable characteristics of non-pupil regions in the image, such as:

1) substantially the same skin color adjacent to each pupil, which may be analyzed as described in the U.S. Pat. No. 5,430,809 to Tomitaka, hereby incorporated by reference in its entirety.
2) the same iris color surrounding each pupil.
3) the presence of nose, mouth, and eyebrows in expected positions relative to pupils, according to predetermined facial models.

As with the spatial cues, the temporal cues may be used to find counterpart (paired) pupils in order to associate pupils with people. Some exemplary temporal cues, useful in identifying counterpart pupils, include: (1) blinking of pupils together, measured by disappearance of two pupils for about 250 milliseconds within several milliseconds of each other, (2) motion of two pupil candidates together while substantially maintaining the same horizontal alignment, (3) two potentially counterpart pupils exhibiting the same range from the camera over time, and (4) other paired pupil characteristics that change over time together.

Tracking Verified Faces

After step 308, the computer 102 begins to track the subjects in the scene 112 (step 310). This is performed by tracking the verified pupil pairs (where each pair represents the eyes of one subject) or the solo pupils (where the other pupil cannot be matched to the solo pupil; for example, the other pupil may not be visible because it is outside the scene 112, covered by another object, etc.). The pupil pairs may be tracked for motion (to determine the position of the associated subject's face), to monitor blinking, to monitor presence/absence from the scene 112, etc. In step 310, the computer 102 may further monitor head and facial expressions of the subjects in the scene 112. Some exemplary head and facial expressions to monitor include head nodding, head shaking left/right, closeness to the camera 104, etc. Also, if faces have not been already identified as part of step 308, this may be accomplished in step 310. For each pupil pair, identification of facial extent in images of the camera 104 may be performed by modifying (resizing) predefined facial models according to the intra ocular distance.

A number of techniques for tracking face position and characteristics are known, as exemplified by the following references: (1) Yang & Waibel "A Real-Time Face Tracker," Proceedings of the Third IEEE Workshop on Applications of Computer Vision, pages 142–147, 1996, (2) Berard et al. "LAFTER: Lips and Face Real Time Tracker," Proc. IEEE Conference on Computer Vision and Pattern Recognition, pages 123–129, June 1997, and (3) Stiefelhagen et al., "A Model-Based Gaze Tracking System," Proceedings of the Joint Symposium on Intelligence and Systems, 1996.

After step 310 begins tracking pupil position and monitoring face expressions, step 312 determines whether any subjects have disappeared, or any new subjects have appeared. If so, the routine starts over again in step 304. Otherwise, if there are no new or missing subjects, pupil tracking and face monitoring continue in step 314.

OTHER EMBODIMENTS

While the foregoing disclosure shows a number of illustrative embodiments of the invention, it will be apparent to those skilled in the art that various changes and modifications can be made herein without departing from the scope of the invention as defined by the appended claims. Furthermore, although elements of the invention may be described or claimed in the singular, the plural is contemplated unless limitation to the singular is explicitly stated.

What is claimed is:

1. A machine-implemented method of associating pupils present in a scene to corresponding subjects, comprising the operations of:
   receiving a machine-readable representation of visually perceivable characteristics of multiple pupil candidates corresponding to multiple subjects in a scene;
   associating each pupil candidate with one of the multiple subjects in the scene by examining at least one of the following: (1) one or more of the visually perceivable characteristics of the pupil candidates at one sample time, and (2) any changes in one or more of the visually perceivable characteristics of the pupil candidates during a sampling period; and
   providing a machine-readable output representing the association of pupil candidates with subjects in the scene.

2. The method of claim 1, where the representation comprises position coordinates of each pupil candidate in at least two dimensions.

3. The method of claim 1, where the subjects include humans.

4. The method of claim 1, where the subjects include non-humans.

5. The method of claim 1, where the representation comprises a machine-readable image representing the scene.

6. The method of claim 1, where the representation comprises a machine-readable image depicting visual appearance of each pupil candidate.

7. The method of claim 1, further comprising operations of generating the machine-readable representation of the pupil candidates.

8. The method of claim 1, where the operation of examining the visually perceivable characteristics of the pupil candidates at one sample time includes identifying any associated pairs of pupil candidates using one or more of the following features:
   horizontal alignment of two pupil candidates with each other, presence of a predetermined interocular distance between two pupil candidates, similar size of two pupil candidates, and similar shape of two pupil candidates.

9. The method of claim 1, where the operation of examining the visually perceivable characteristics of the pupil candidates at one sample time further includes identifying any associated pairs of pupil candidates using facial features external to the pupil candidates, the external features including one or more of the following:
   presence of a nose in predetermined relationship between two pupil candidates presence of a mouth in predetermined relationship between two pupil candidates, presence of irises of substantially similar color surrounding two pupil candidates, presence of skin of substantially similar color surrounding two pupil candidates.

10. The method of claim 1, where the operation of examining any changes in the visually perceivable characteristics of the pupil candidates during a sampling period further includes identifying any associated pairs of pupil candidates using one or more of the following features:
    substantially identical motion of two pupil candidates without relative motion therebetween, and eye blinking indicated by substantially concurrent disappearance and reappearance of the pupil candidates.

11. The method of claim 1, where the representation includes an image representing visual appearance of the scene, and the examining operation further includes identifying any associated pairs of pupil candidates, and the operations further include:
    using distance between associated pupils to estimate extent of an associated face in the scene.

12. The method of claim 1, the examining operation further comprising applying a predetermined filtering process to the pupil candidates to eliminate pupil candidates exhibiting certain non-pupil traits.

13. The method of claim 1, the operations further comprising:
    receiving updated machine-readable representations of the visually perceivable characteristics of pupil candidates in the scene; and
    employing the updated representations to track movement of one or more pupil candidates.

14. The method of claim 1, the operations further comprising:
    receiving updated machine-readable representations of the visually perceivable characteristics of pupil candidates in the scene;
    employing the updated representations to track movement of one or more pupil candidates; and
    responsive to losing track of a pupil candidate, repeating the receiving and associating operations.

15. The method of claim 1, the operations further comprising:
    receiving updated machine-readable representations of the visually perceivable characteristics of pupil candidates in the scene;
    employing the updated representations to detect presence of any new pupil candidates; and
    responsive to detecting a new pupil candidate, repeating the associating operation.

16. The method of claim 1, the operations further comprising employing the association of pupil candidates with subjects to identify faces in the scene.

17. The method of claim 16, the operations further comprising monitoring changes in the expressions of the faces.

18. A signal-bearing medium tangibly embodying a program of machine-readable instructions executable by a digital data processing machine to perform operations for correlating pupils present in a scene to corresponding persons, the operations comprising:

receiving a machine-readable representation of visually perceivable characteristics of multiple pupil candidates corresponding to multiple subjects in a scene;

associating each pupil candidate with one of the multiple subjects in the scene by examining at least one of the following: (1) one or more of the visually perceivable characteristics of the pupil candidates at one sample time, and (2) any changes in one or more of the visually perceivable characteristics of the pupil candidates during a sampling period; and providing a machine-readable output representing the association of pupil candidates with subjects in the scene.

19. The medium of claim 18, where the representation comprises position coordinates of each pupil candidate in at least two dimensions.

20. The medium of claim 18, where the representation comprises a machine-readable image representing the scene.

21. The medium of claim 18, where the representation comprises a machine-readable image depicting visual appearance of each pupil candidate.

22. The medium of claim 18, further comprising operations of generating the machine-readable representation of the pupil candidates.

23. The medium of claim 18, where the operation of examining the visually perceivable characteristics of the pupil candidates at one sample time includes identifying any associated pairs of pupil candidates using one or more of the following features:

horizontal alignment of two pupil candidates with each other, prescence of a predetermined interocular distance between two pupil candidates, similiar size of two pupil candidates, and similiar shape of two pupil candidates.

24. The medium of claim 18, where the operation of examining the visually perceivable characteristics of the pupil candidates at one sample time further includes identifying any associated pairs of pupil candidates using facial features external to the pupil candidates, the external features including one or more of the following:

presence of a nose in predetermined relationship between two pupil candidates, presence of a mouth in predetermined relationship between two pupil candidates, presence of irises of substantially similar color surrounding two pupil candidates, presence of skin of substantially similar color surrounding two pupil candidates.

25. The medium of claim 18, where the operation of examining any changes in visually perceivable characteristics of the pupil candidates during a sampling period further includes identifying any associated pairs of pupil candidates using one or more of the following features:

substantially identical motion of two pupil candidates without relative motion therebetween, and eye blinking indicated by substantially concurrent disappearance and reappearance of the pupil candidates.

26. The medium of claim 18, where the representation includes an image representing visual appearance of the scene, and the examining operation further includes identifying any associated pairs of pupil candidates, and the operations further include:

using distance between associated pupils to estimate extent of an associated face in the scene.

27. The medium of claim 18, the examining operation further comprising applying a predetermined filtering process to the pupil candidates to eliminate pupil candidates exhibiting prescribed non-pupil characteristics.

28. The medium of claim 18, the operations further comprising:

receiving updated machine-readable representations of the visually perceivable characteristics of pupil candidates in the scene; and employing the updated representations to track movement of one or more pupil candidates.

29. The medium of claim 18, the operations further comprising:

receiving updated machine-readable representations of the visually perceivable characteristics of pupil candidates in the scene;

employing the updated representations to track movement of one or more pupil candidates; and responsive to losing track of a pupil candidate, repeating the associating operation.

30. The medium of claim 18, the operations further comprising:

receiving updated machine-readable representations of the visually perceivable characteristics of pupil candidates in the scene;

employing the updated representations to detect presence of any new pupil candidates; and responsive to detecting a new pupil candidate, repeating associating operation.

31. The medium of claim 18, the operations further comprising employing the association of pupil candidates with subjects to identify faces in the scene.

32. The method of claim 31, the operations further comprising monitoring changes in expressions of the faces.

33. A logic circuit of multiple interconnected electrically conductive elements configured to perform operations to correlate pupils present in a scene to corresponding persons, the operations comprising:

receiving a machine-readable representation of visually perceivable characteristics of multiple pupil candidates corresponding to multiple subjects in a scene;

associating each pupil candidate with one of the multiple subjects in the scene by examining at least one of the following: (1) one or more of the visually perceivable characteristics of the pupil candidates at one sample time, and (2) any changes in one or more of the visually perceivable characteristics of the pupil candidates during a sampling period; and providing a machine-readable output representing the association of pupil candidates with subjects in the scene.

34. The circuit of claim 33, where the representation comprises position coordinates of each pupil candidate in at least two dimensions.

35. The circuit of claim 33, where the representation comprises a machine-readable image representing the scene.

36. The circuit of claim 33, where the representation comprises a machine-readable image depicting visual appearance of each pupil candidate.

37. The circuit of claim 33, further comprising operations of generating the machine-readable representation of the pupil candidates.

38. The circuit of claim 33, where the operation of examining the visually perceivable characteristics of the pupil candidates at one sample time includes identifying any associated pairs of pupil candidates using one or more of the following features:

horizontal alignment of two pupil candidates with each other, presence of a predetermined interocular distance between two pupil candidates, similar size of two pupil candidates, and similar shape of two pupil candidates.

39. The circuit of claim 33, where the operation of examining the visually perceivable characteristics of the pupil candidates at one sample time further includes identifying any associated pairs of pupil candidates using facial features external to the pupil candidates, the external features including one or more of the following:

presence of a nose in predetermined relationship between two pupil candidates, presence of a mouth in predetermined relationship between two pupil candidates, presence of irises of substantially similar color surrounding two pupil candidates, presence of ski n of substantially similar color surrounding two pupil candidates.

40. The circuit of claim 33, where the operation of examining any changes in visually perceivable characteristics of the pupil candidates during a sampling period further includes identifying any associated pairs of pupil candidates using one or more of the following features:

substantially identical motion of two pupil candidates without relative motion therebetween, and eye blinking indicated by substantially concurrent disappearance and reappearance of the pupil candidates.

41. The circuit of claim 33, where the representation includes an image representing visual appearance of the scene, and the examining operation further includes identifying any associated pairs of pupil candidates, and the operations further include:

using distance between associated pupils to estimate extent of an associated face in the scene.

42. The circuit of claim 33, the examining operation further comprising applying a predetermined filtering process to the pupil candidates to eliminate pupil candidates exhibiting prescribed non-pupil characteristics.

43. The circuit of claim 33, the operations further comprising:

receiving updated machine-readable representations of the visually perceivable characteristics of pupil candidates in the scene; and employing the updated representations to track movement of one or more pupil candidates.

44. The circuit of claim 33, the operations further comprising:

receiving updated machine-readable representations of the visually perceivable characteristics of pupil candidates in the scene;

employing the updated representations to track movement of one or more pupil candidates; and responsive to losing track of a pupil candidate, repeating the associating operation.

45. The circuit of claim 33, the operations further comprising:

receiving updated machine-readable representations of the visually perceivable characteristics of pupil candidates in the scene;

employing the updated representations to detect presence of any new pupil candidates; and responsive to detecting a new pupil candidate, repeating the associating operation.

46. The circuit of claim 33, the operations further comprising employing the association of pupil candidates with subjects to identify faces in the scene.

47. The circuit of claim 46, the operations further comprising monitoring changes in expressions of the faces.

48. A human-machine interface, comprising:

a camera to produce one or more machine-readable images of a scene; and a digital data processing machine, coupled to the camera, and programmed to perform operations to correlate any pupils present in the scene to corresponding persons, the operations comprising:

receiving a machine-readable representation of visually perceivable characteristics of multiple pupil candidates corresponding to multiple subjects in a scene;

associating each pupil candidate with one of the multiple subjects in the scene by examining at least one of the following: (1) one or more of the visually perceivable characteristics of the pupil candidates at one sample time, and (2) any changes in one or more of the visually perceivable characteristics of the pupil candidates during a sampling period; and providing a machine-readable output representing the association of pupil candidates with subjects in the scene.

49. The system of claim 48, the camera comprising a video camera.

50. The system of claim 48, further comprising a light source.

51. The system of claim 48, further comprising an output device coupled to the digital data processing machine, the digital data processing machine being programmed to provide the output to the output device.

52. The system of claim 48, where the representation comprises position coordinates of each pupil candidate in at least two dimensions.

53. The system of claim 48, where the representation comprises a machine-readable image representing the scene.

54. The system of claim 48, where the representation comprises a machine-readable image depicting visual appearance of each pupil candidate.

55. The system of claim 48, the digital data processing machine being further programmed to operate the camera to generate the machine-readable representation by creating a machine-readable image of the pupil candidates.

56. The system of claim 48, where the operation of examining the visually perceivable characteristics of the pupil candidates at one sample time includes identifying any associated pairs of pupil candidates using one or more of the following features:

horizontal alignment of two pupil candidates with each other, presence of a predetermined interocular distance between two pupil candidates, similar size of two pupil candidates, and similar shape of two pupil candidates.

57. The system of claim 48, where the operation of examining the visually perceivable characteristics of the pupil candidates at one sample time further includes identifying any associated pairs of pupil candidates using facial features external to the pupil candidates, the external features including one or more of the following:

presence of a nose in predetermined relationship between two pupil candidates, presence of a mouth in predetermined relationship between two pupil candidates, presence of substantially similar iris surrounding two pupil candidates, presence of skin of substantially similar color surrounding two pupil candidates.

58. The system of claim 48, where the operation of examining any changes in visually perceivable characteristics of the pupil candidates during a sampling period further includes identifying any associated pairs of pupil candidates using one or more of the following features:

substantially identical motion of two pupil candidates without any relative motion, therebetween, and eye blinking indicated by substantially concurrent disappearance and reappearance of the pupil candidates.

59. The system of claim 48, where the representation includes an image representing visual appearance of the scene, and the examining operation further includes identifying any associated pairs of pupil candidates, and the operations further include:

using distance between associated pupils to estimate extent of an associated face in the scene.

60. The system of claim 48, the examining operation further comprising applying a predetermined filtering process to the pupil candidates to eliminate pupil candidates exhibiting prescribed non-pupil characteristics.

61. The system of claim 48, the operations further comprising:

receiving updated machine-readable representations of the visually perceivable characteristics of pupil candidates in the scene; and employing the updated representations to track movement of one or more pupil candidates.

62. The system of claim 48, the operations further comprising:

receiving updated machine-readable representations of the visually perceivable characteristics of pupil candidates in the scene;

employing the updated representations to track movement of one or more pupil candidates; and responsive to losing track of a pupil candidate, repeating the associating operation.

63. The system of claim 48, the operations further comprising:

receiving updated machine-readable representations of the visually perceivable characteristics of pupil candidates in the scene;

employing the updated representations to detect presence of any new pupil candidates; and responsive to detecting a new pupil candidate, repeating the associating operation.

64. The system of claim 48, the operations further comprising employing the association of pupil candidates with subjects to identify faces in the scene.

65. The method of claim 64, the operations further comprising monitoring changes in expressions of the faces.

* * * * *